United States Patent [19]

McDonald et al.

[11] Patent Number: 5,277,298
[45] Date of Patent: Jan. 11, 1994

[54] CONVEYOR TROLLEY BRACKET

[75] Inventors: Clayton C. McDonald, Howell; Daniel S. Ellens, Brighton, both of Mich.; Raymond L. Milne, Union, S.C.

[73] Assignee: Jervis B. Webb Company, Farmington Hills, Mich.

[21] Appl. No.: 46,209

[22] Filed: Apr. 12, 1993

[51] Int. Cl.$^5$ ............................................. B65G 17/32
[52] U.S. Cl. ..................................... 198/687; 104/95; 105/155; 198/686
[58] Field of Search ....................... 198/685, 686, 687; 104/95; 105/155

[56] References Cited

U.S. PATENT DOCUMENTS

| | | | |
|---|---|---|---|
| 2,075,261 | 3/1937 | Bishop | 198/687 |
| 2,411,906 | 12/1946 | Suman | 198/687 |
| 2,660,291 | 11/1953 | Dugle | 198/686 |
| 4,220,243 | 9/1980 | Frost et al. | 104/95 X |
| 4,228,738 | 10/1980 | Forshee | 198/687 X |
| 4,262,796 | 4/1981 | McDonald | 198/687 |
| 4,266,658 | 5/1981 | Frost et al. | 198/687 |

*Primary Examiner*—James R. Bidwell
*Attorney, Agent, or Firm*—Joseph W. Farley

[57] ABSTRACT

A forged conveyor trolley bracket has head, arm and base portions bounded by sides, and a bent elbow formed in the arm portion medially of the head and base portions. A web, disposed centrally between the sides along the base and arm portions, has outer and inner faces. Projecting from the web outer face adjacent to the bracket sides are a pair of base portion reinforcing ribs and an outer pair of arm portion reinforcing ribs forming continuations of the base portion reinforcing ribs. An inner pair of arm portion reinforcing ribs project from the web inner face along the arm portion in opposed aligned relation with the outer pair of arm portion ribs; and, this inner pair of ribs extends from the base portion along the arm portion with a depth which increases to substantially equal the depth of the outer pair of ribs at the bent elbow, and which gradually decreases from the bent elbow to the head portion where the inner pair of ribs terminates. This configuration of the trolley bracket results in manufacturing economies and improved physical characteristics.

6 Claims, 2 Drawing Sheets

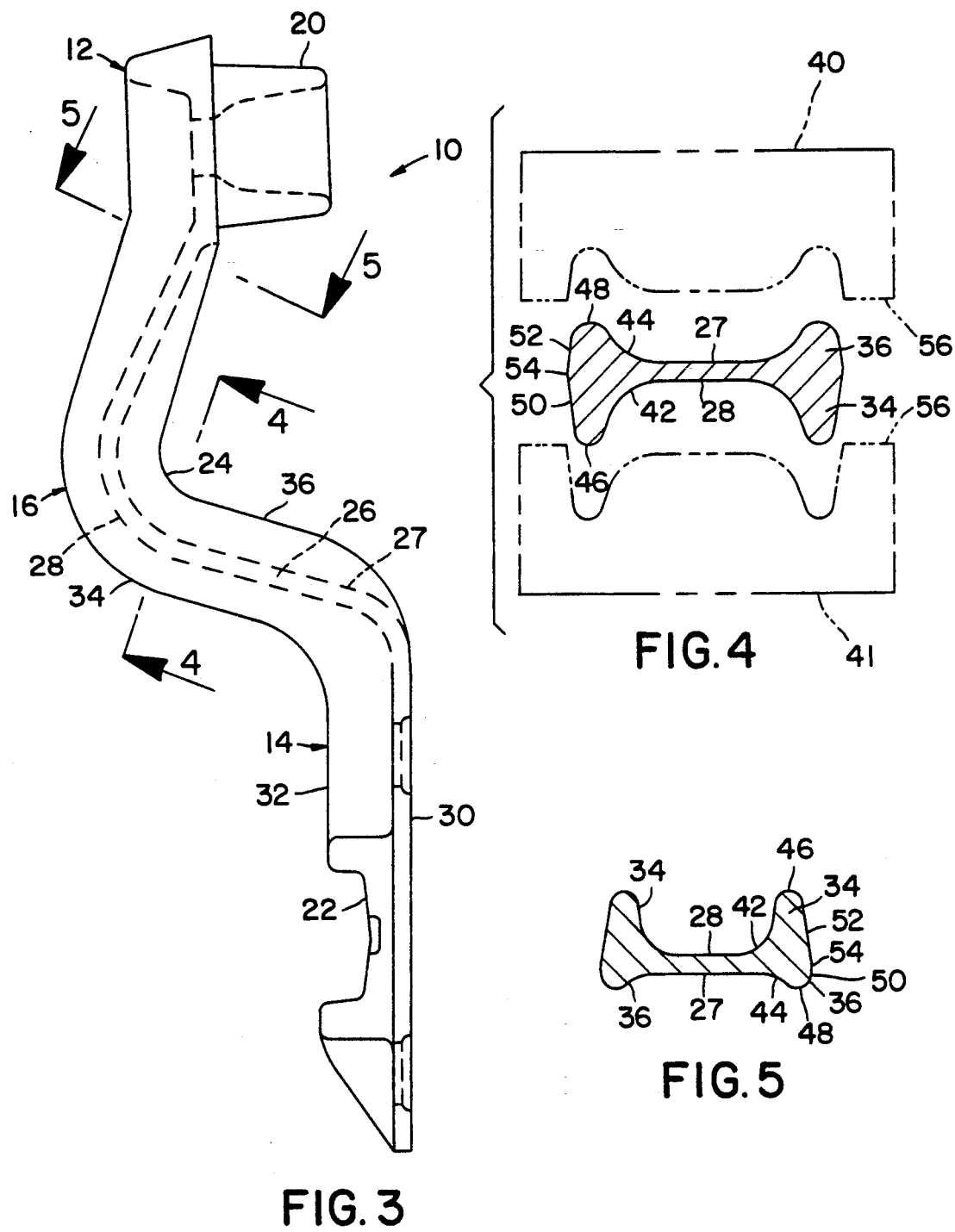

CONVEYOR TROLLEY BRACKET

This invention relates to an improved construction for a trolley bracket of the type used in an overhead chain conveyor where trolley assemblies, each including a pair of such brackets having wheels supported by an overhead track, are connected to a propelling chain.

Such a trolley bracket conventionally comprises head, arm and base portions bounded by sides, the head portion having means for supporting a trolley wheel, the base portion having means for engagement with a conveyor chain, and the arm portion extending from the base portion to the head portion and having a bent elbow medially thereof.

For rigidity, the arm portion of the trolley bracket has been formed with a central stiffening rib in a T-sectional configuration as exemplified by U.S. Pat. Nos. 1,541,539 and 2,411,906; or, with a pair of side ribs in a U-shaped sectional configuration as exemplified by U.S. Pat. Nos. 1,721,759, 2,075,261 and 4,262,796. Each of these patents illustrates the relationship between an overhead conveyor track, a conveyor chain and a trolley formed by a pair of brackets of the general type to which the present invention relates. These prior trolley brackets have usually been formed by a forging process.

The present invention provides an improved trolley bracket which has certain advantages in physical properties and in manufacturing economies, as will appear from the detailed description of the invention given below.

In a trolley bracket of the invention, having the conventional head, arm and base portions bounded by sides with the arm portion having a bent elbow medially of the base and head portions, as described above, a web having outer and inner faces is disposed centrally between the sides along the base and arm portions, and a pair of base portion reinforcing ribs project from the outer web face adjacent to the base portions sides. A first pair of arm portion reinforcing ribs project the outer web face of the arm portion adjacent to the sides thereof and form continuations of the pair of base portion reinforcing ribs. A second pair of arm portion reinforcing ribs project from the inner web face of the arm portion in opposed aligned relation with the first pair of arm portion reinforcing ribs. This second pair of arm portion reinforcing ribs extends from the base portion along the arm portion with an increasing depth which substantially equals the depth of the first pair of reinforcing ribs along the medial bent elbow of the arm portion. The depth of the second pair of arm portion reinforcing ribs gradually decreases from the medial bent elbow to the head portion where the second pair of reinforcing ribs terminates.

Preferably, the first and second pair of arm portion reinforcing ribs respectively merge with the outer and inner web faces on radially arcuate lines and extend to ends defined by radially arcuate lines. Each side of the arm portion is defined by converging side surfaces of the first and second pairs of arm portion reinforcing ribs, the converging side surfaces having an apex located substantially midway of the distance between the web outer and inner faces. This apex defines a portion of a parting line between a pair of forging dies preferably employed in the manufacture of the trolley bracket.

The foregoing and other features and advantages of the invention will appear from the description to follow of the trolley bracket shown in the accompanying drawings.

DESCRIPTION OF THE DRAWINGS

FIG. 3 is an end elevation of the trolley bracket of FIG. 1;

FIG. 4 is a sectional view, taken as indicated by the line 4—4 of FIG. 3, and including a schematic representation of forging die configuration for forming the trolley bracket at this section thereof; and FIG. 5 is a sectional view taken as indicated by the line 5—5 of FIG. 3.

DETAILED DESCRIPTION

Figures 1, 2:
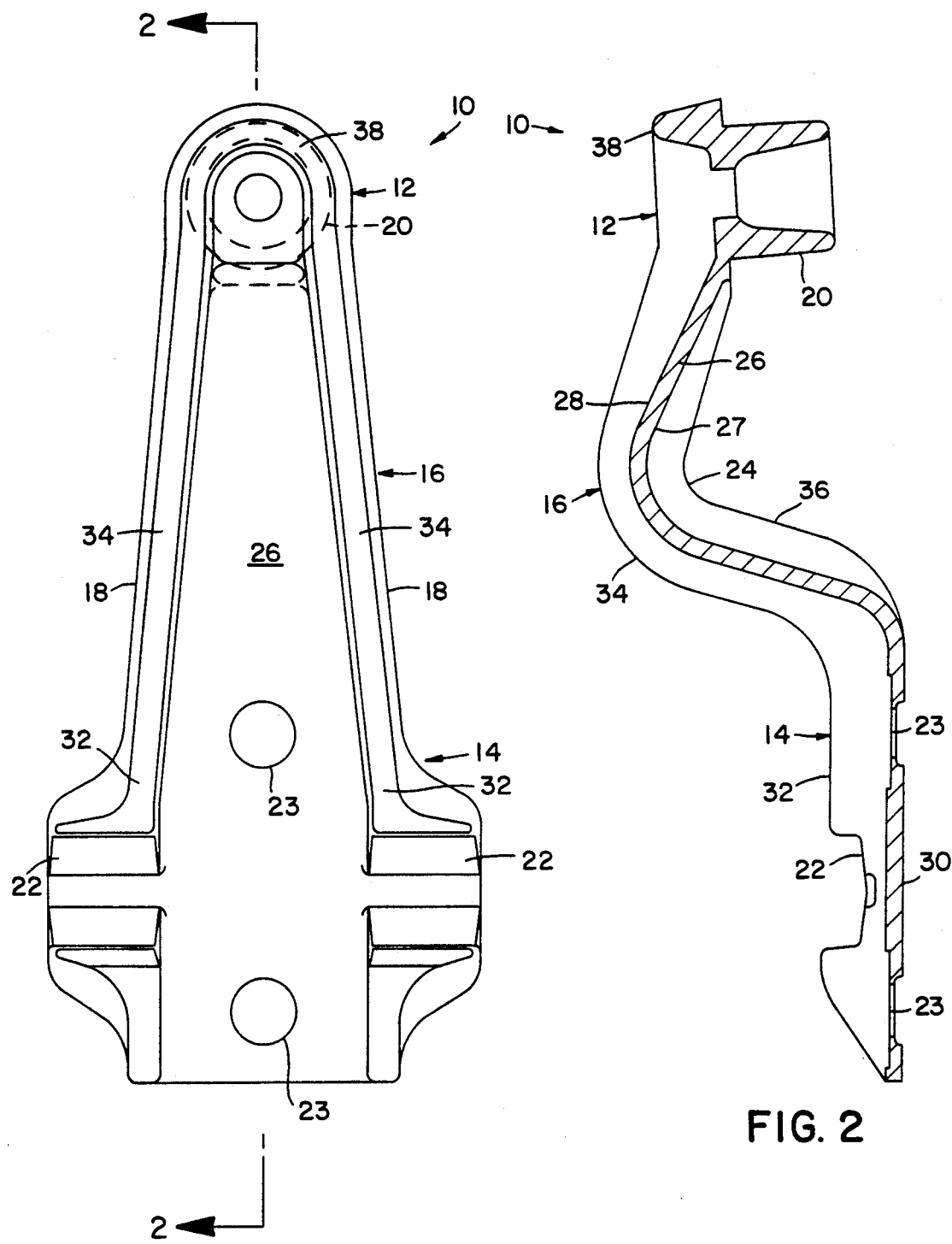
FIG. 1 is a side elevation of a trolley bracket constructed in accordance with the invention.
FIG. 2 is a sectional elevation taken as indicated by the line 2—2 of FIG. 1.

A trolley bracket 10 of the invention shown in FIGS. 1-3 of the drawings has a head portion 12, a base portion 14, and an arm portion 16, these portions being bounded by sides 18. The head portion 12 is provided with a hub 20 or other suitable means for supporting a trolley wheel. On the base portion 14 are provided outwardly facing recesses 22 for engagement with a conveyor chain together with bolt-receiving apertures 23 for connecting the bracket 10 to other components of a trolley assembly such as shown in U.S. Pat. No. 4,262,796. The arm portion 16 extends from the base portion 14 to the head portion 12 and has a bent elbow 24 formed substantially medially thereof.

A web 26 is disposed between the bracket sides 18 along the base and arm portions 14, 16, and has an inner face 27 and an outer face 28. On the base portion 14, the web inner face forms part of a planar inner surface 30, and a pair of base portion reinforcing ribs 32 project from the web outer face 28 adjacent to the base portion sides, the chain engaging recesses 22 being formed in these ribs 32.

The base portion reinforcing ribs 32 blend into a first or outer pair of arm portion reinforcing ribs 34 which project from the web outer face 28 of the arm portion 16 adjacent to the sides 18 thereof, and which form continuations of the pair of base portion reinforcing ribs 32. A second or inner pair of arm reinforcing ribs 36 projects from the web inner face 27 of the arm portion in opposed, aligned relation with the outer pair of arm portion reinforcing ribs 34. This inner pair of arm reinforcing ribs 36 extends (as shown in FIG. 2) from the planar inner surface 30 of the base portion 14 to the arm portion 16 with an increasing depth which substantially equals the depth of the outer pair of reinforcing ribs 34 along the medial bent elbow 24 of the arm portion 16, and which depth gradually decreases from the medial bent elbow 24 to the head portion 12 where the inner reinforcing ribs 36 terminate. However, the head portion 12 is provided with a semi-circular continuation 38 of the outer pair of arm portion reinforcing ribs 34.

The trolley bracket 10 shown is preferably fabricated by forging a metal blank, such as a cylindrical bar, between a pair of dies, portions 40 and 41 of which are schematically indicated in broken line in FIG. 4. This view, together with FIG. 5, illustrate that the configuration of the trolley bracket, particularly the arm portion 16 thereof, is such as to reduce the flow of metal required in the forging process. In comparison with prior trolley brackets formed with a T-shaped or a channel-shaped section, the I-type section of the arm portion 16 divides the required flow of metal between the outer and inner pairs of reinforcing ribs 34 and 36.

Moreover, each outer reinforcing rib 34 merges with the web outer face 28 on a radially arcuate line 42, each inner reinforcing rib 36 likewise merges with the web inner face 27 on a radially arcuate line 44, and each of the reinforcing ribs 34 and 36 extends to an end defined by a radially arcuate line 46 and 48, respectively. Each side of the arm portion 16 is formed by converging side surfaces 50 and 52 of the reinforcing ribs 34 and 36, which converging side surfaces meet at an apex 54 located substantially midway of the distance between the web inner and outer faces 27 and 28. The apex 54 is defined by the parting line 56 between the forging dies 41 and 42 along the arm portion 16 of the trolley bracket 10; and, the angular relation of the converging side surfaces is defined by he draft angle of the dies which is preferably on the order of 8.5° for all of the reinforcing ribs 32, 34 and 36.

From a manufacturing standpoint, the ease in forging resulting from the configuration of the trolley bracket 10 improves die life, reduces die maintenance and reduces scrap. Structurally, the sectional configuration of the trolley bracket 10, and particularly of the arm portion 16 thereof, improves torsional rigidity. In comparison with a prior channel section type of trolley bracket, the trolley bracket 10 of similar size and strength requires less material. The cumulative economics resulting from these manufacturing and structural advantages of the invention are significant.

We claim:

1. A conveyor trolley bracket comprising head, arm and base portions bounded by sides, said head portion having means for supporting a trolley wheel, said base portion having means for engagement with a conveyor chain, and said arm portion extending from said base portion to said head portion and having a bent elbow medially of said base and head portions, wherein the improvement comprises:

a web disposed centrally between said sides along said base and arm portions and having inner and outer web faces;

a pair of base portion reinforcing ribs projecting from said web outer face adjacent to the sides of said base portion;

a first pair of arm portion reinforcing ribs projecting from said web outer face of said arm portion adjacent to the sides thereof, said first pair of arm portion reinforcing ribs forming continuations of said pair of base portion reinforcing ribs; and a second pair of arm portion reinforcing ribs projecting from said webb inner face of said arm portion in opposed aligned relation with said first pair of arm portion reinforcing ribs, said second pair of arm portion reinforcing ribs extending from said base portion along said arm portion with an increasing depth which substantially equals the depth of said first pair of arm reinforcing ribs along the medial bent elbow of said arm portion.

2. A conveyor trolley bracket according to claim 1 wherein said first and second pairs of arm portion reinforcing ribs respectively merge with said web outer and web inner faces and are formed with ends of substantially arcuate configuration.

3. A conveyor trolley bracket according to claim 1 wherein said first and second pairs of arm portion reinforcing ribs respectively merge with web outer and web inner faces on radially arcuate lines and extend to ends defined by radially arcuate lines.

4. A conveyor trolley bracket according to claim 3 wherein said second pair of arm portion reinforcing ribs decrease in depth from the medial bent elbow to terminate at said head portion, and said head portion is provided with a continuation of said first pair of arm portion reinforcing ribs.

5. A conveyor trolley bracket according to claim 4 wherein each side of said arm portion is defined by converging side surfaces of said first and second pairs of arm portion reinforcing ribs, said converging side surfaces having an apex located substantially midway of the distance between said web outer and inner faces.

6. A conveyor trolley bracket according to claim 5 wherein said apex defines a portion of parting line between a pair of forging dies adapted to form the trolley bracket.

* * * * *